Jan. 21, 1958   J. H. ARMITAGE   2,820,559
AUXILIARY CARGO VEHICLE FOR TRUCKING VEHICLES
Filed Nov. 30, 1956   4 Sheets-Sheet 3
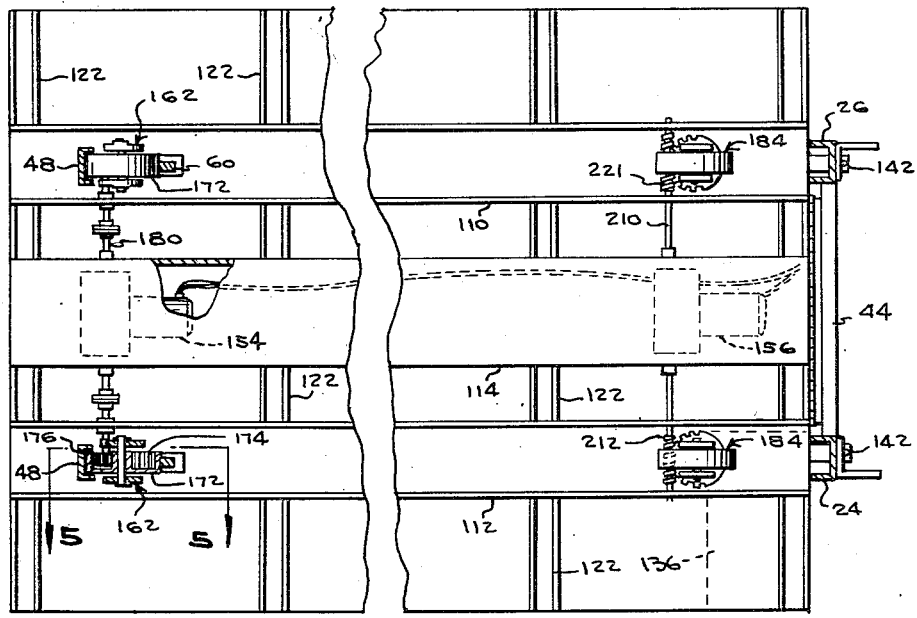
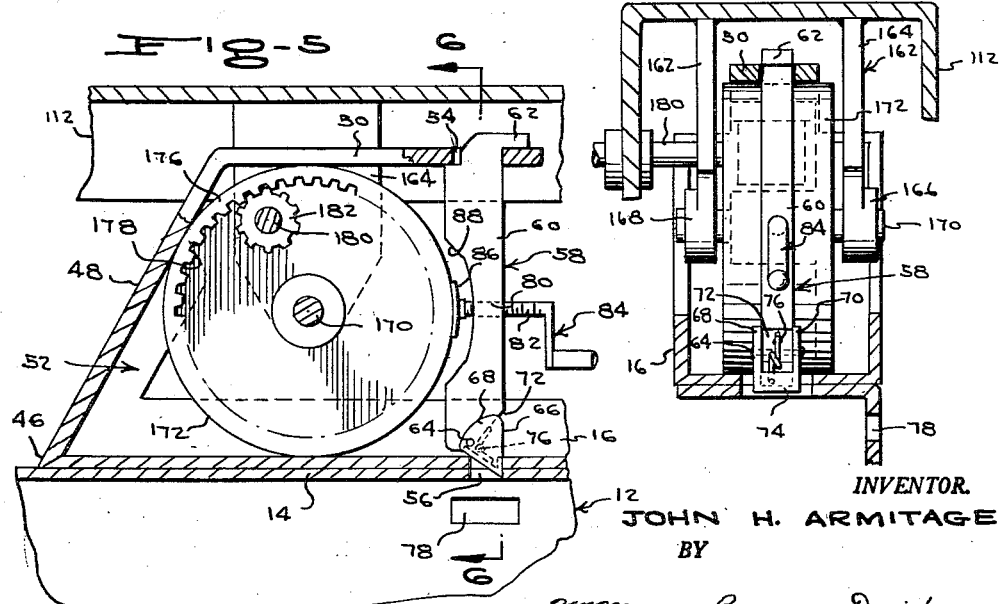
INVENTOR.
JOHN H. ARMITAGE
BY
McMorrow, Berman & Davidson
ATTORNEYS

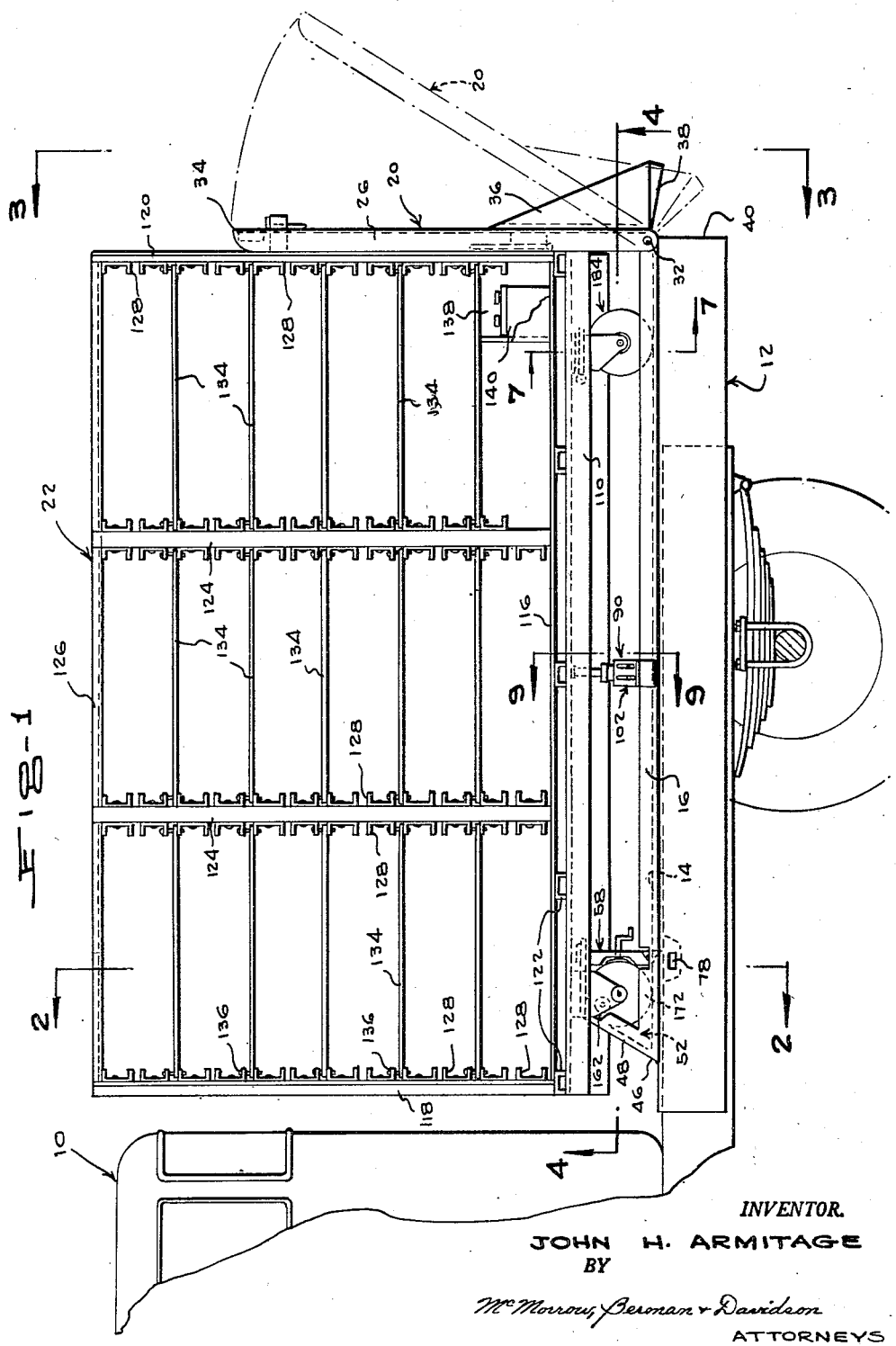

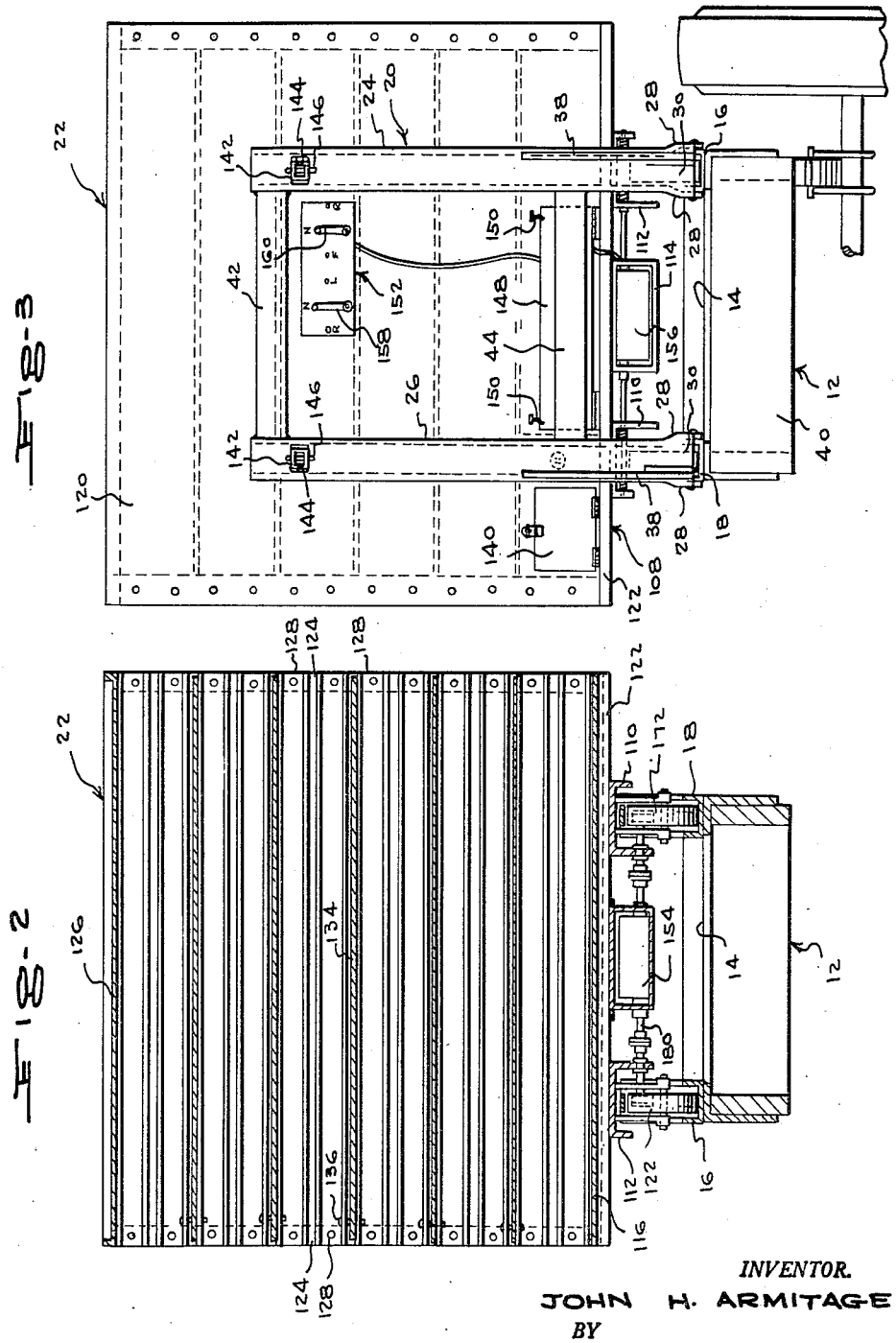

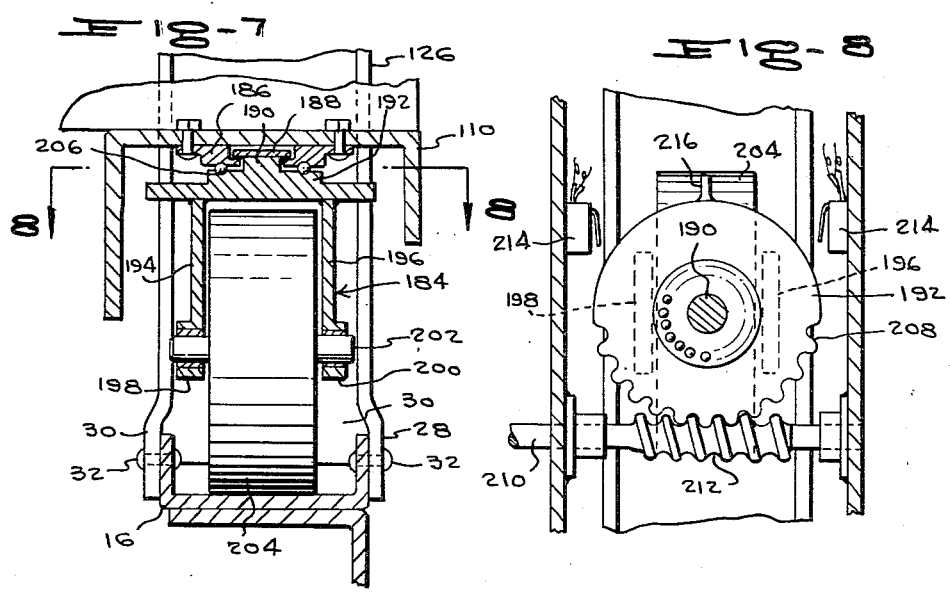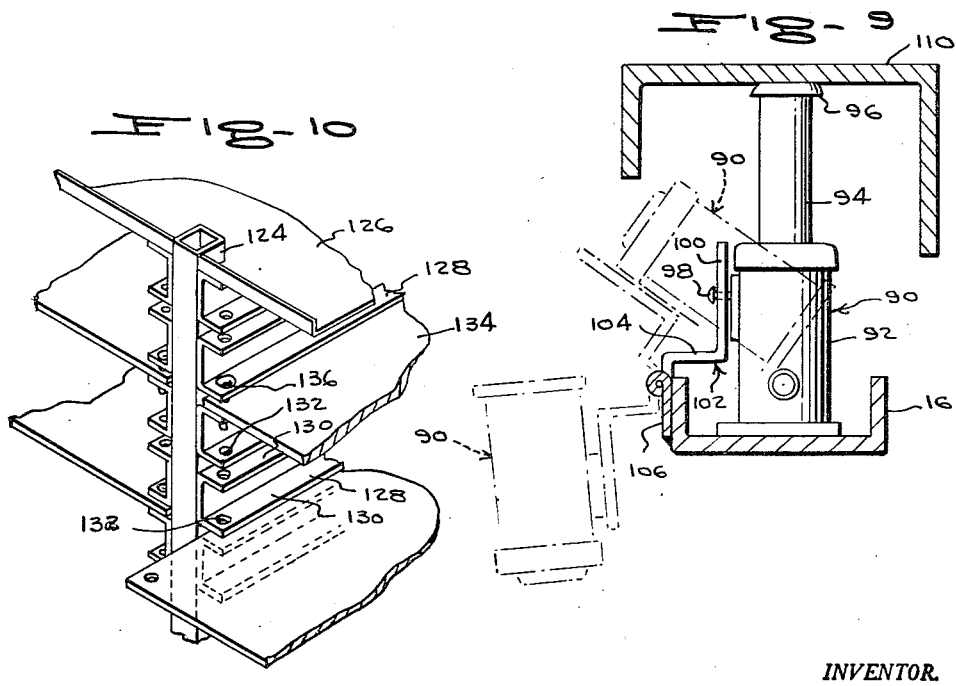

United States Patent Office 2,820,559
Patented Jan. 21, 1958

2,820,559

AUXILIARY CARGO VEHICLE FOR TRUCKING VEHICLES

John H. Armitage, Lima, Ohio

Application November 30, 1956, Serial No. 625,402

7 Claims. (Cl. 214—515)

This invention relates generally to trucking vehicles and is more particularly concerned with an auxiliary cargo vehicle readily pre-loaded for subsequent disposition in secured relationship on the bed of a trucking vehicle.

In services such as the delivery of dairy products, bottled beverages and the like, the person delivering such items spends a considerable amount of time loading and unloading a trucking vehicle prior to such delivery. The amount of time utilized for loading the vehicles, for example, often results in late delivery of the items, and if the items are perishable they may spoil during transit.

A primary object of the invention is to provide an auxiliary cargo vehicle which is power operated including means facilitating the loading thereof, and further including a trucking vehicle having track means on the upper surface thereof facilitating the disposition of a loaded auxiliary cargo vehicle thereon in a suitably secured relationship.

Still further objects of invention in conformance with that set forth reside in specific structural details of the cooperating structure of the auxiliary cargo vehicle and trucking vehicles with which the auxiliary cargo vehicle cooperates.

And yet another object of invention in conformance with that set forth is to provide in an auxiliary cargo vehicle of the character involved improved power drive and power steering means therefor.

And still another object of invention in conformance with that set forth is to provide in an auxiliary cargo vehicle for use on trucking vehicles means facilitating the disposition of the cargo vehicle on a trucking vehicle, means for retaining the cargo vehicle on the bed of the trucking vehicle, permitting pre-loading of the auxiliary cargo vehicle accordingly eliminating the time loss involved when a driver of a trucking vehicle must load the same with cargo to be delivered.

And yet another object of invention in conformance with that set forth is to provide an auxiliary cargo vehicle cooperating with the bed of a trucking vehicle, said structure being readily and economically manufactured, easily used, and highly satisfactory and practical for the purpose intended.

These together with other objects and advantages which will subsequently become apparent reside in the details of construction and operation as more fully hereinafter described and claimed, reference being had to the accompanying drawing forming a part hereof, wherein like numerals refer to like parts throughout, and in which:

Figure 1 is a fragmentary side elevation of a trucking vehicle, showing the support bed thereof, and having disposed on said support bed an auxiliary cargo vehicle, the loading ramp of the cargo vehicle being shown by means of phantom lines;

Figure 2 is a vertical section taken substantially on the plane of line 2—2 of Figure 1;

Figure 3 is a rear elevation looking substantially from the plane of line 3—3 of Figure 1, portions being broken away;

Figure 4 is a horizontal section taken substantially on the plane of line 4—4 of Figure 1;

Figure 5 is an enlarged fragmentary section taken substantially on the plane of line 5—5 of Figure 4;

Figure 6 is a section taken substantially on the plane of line 6—6 of Figure 5;

Figure 7 is an enlarged fragmentary section taken substantially on the plane of line 7—7 of Figure 1;

Figure 8 is a section taken substantially on the plane of line 8—8 of Figure 7;

Figure 9 is an enlarged fragmentary section taken substantially on the plane of line 9—9 of Figure 1, showing by means of phantom lines an alternate position of the jack means utilized on the truck bed; and Figure 10 is an enlarged fragmentary perspective showing the manner in which the tiers of separable shelves of the auxiliary cargo vehicle are assembled and disassembled.

Referring to the drawing in detail, indicated generally at 10 is a trucking vehicle incorporating a vehicular chassis 12, said chassis including on the upper portion thereof a suitably constructed truck bed 14. Suitably secured in longitudinally extending parallel relationship adjacent opposite side edges of the truck bed 14 are tracks 16 and 18 conveniently comprising channel members having a U-shaped cross section.

Indicated generally at 20 is a vertically pivotal ramp facilitating the loading of an auxiliary cargo vehicle indicated generally at 22 on the vehicle bed 14. The ramp 20 includes a pair of mutually parallel upwardly opening channel members 24 and 26 extending longitudinally from a rear portion of the tracks 16 and 18, respectively. The channel members 24 and 26 include at the ends thereof adjacent the tracks offset side flange portions 28 and an increased width web portion 30 transversely therebetween, the flange 30 receiving therebetween the rear end portion of the tracks and being pivotally connected thereto by means of suitable transverse pivot pins 32, see Figure 7. The ramp 20 may be disposed with its terminal end 34 on a loading dock or the like facilitating the movement of the auxiliary cargo vehicle 22 onto the bed 14 of the trucking vehicle. Incorporated in suitably secured laterally extending relationship on the web of the channel members 24 and 26 are suitable abutment plates 36, the lower edge portions 38 thereof being abuttingly engageable with the rear end 40 of the vehicle chassis for disposing the ramp in a substantially horizontally disposed position when the terminal end thereof is not disposed on a loading dock or the like. Extending transversely between opposed inner surface portions of the channels 24 and 26, see Figure 3, are suitable brace elements 42 and 44.

The channels 16 and 18 incorporate at their forward ends 46, see Figure 5, an angular end wall 48 terminating in a rearwardly extending upper wall 50 substantially horizontal to the web of the channel members 16 and 18. The aforementioned construction defines a recess portion indicated generally at 52 at the forward ends of the channels 16 and 18 defining a pocket portion for receiving the forward wheels of the auxiliary cargo vehicle 22 therein, the forward wall 48 defining an abutment for said wheels. The upper wall 50 has extending therethrough a transverse aperture portion 54 in alignment with a transverse aperture portion 56 extending through the web of the channel members 16 and 18 and the bed 14 of the trucking vehicle. The apertures 54 and 56 are in overlying alignment and provide means for removably receiving a crowd-bar assembly indicated generally at 58.

As most clearly seen in Figures 5 and 6, the crowd-bar assembly 58 includes an elongated body member 60 terminating in an offset lateral flange portion 62 which will extend through the aperture 54 and overlie the upper wall 50. The lower end of the body member 60 has extending transversely thereacross a suitable pivot pin element 64 pivotally supporting on opposite sides of the body member 60 a triangularly shaped latch element 66. The latch element 66 has a U-shaped cross section, see Figure 6, opposite side portions 68 and 70 being disposed on the opposite sides of the body member 60. The lower end of the body member 60 incorporates an angular surface portion 72. Suitably secured on the lower web portion 74 of the latch element 66 is one end of a hairpin spring 76, the other end of which abuttingly engages the angular surface 72 of the body member. The hairpin spring 76 is effective to urge the latch element 66 in a clockwise direction about the pivot pin 64 as viewed in Figure 5, accordingly urging the latch element 66 into the aperture 56 previously mentioned. The vehicle chassis 12 incorporates through the side thereof a transverse aperture 78 facilitating the insertion of a pry bar or the like therethrough for urging the latch element 66 out of the aperture 56 when it is desired to remove the crowd-bar assembly 58 from the channel members 16 and 18.

The body member 60 has extending transversely through an internally threaded bore portion 80 a threaded shaft 82 of a suitable crank 84, said shaft 82 having journaled transversely on the end thereof extending toward the abutment wall or end 48 a clamping plate 86 engageable with the outer periphery of a wheel disposed in the recess portion 52. The body member 60 incorporates an undercut arcuate edge portion 88 facilitating the movement of the clamping plate 86 toward and away from a wheel disposed in said recess portion.

Suitably secured on the outer flanges of the channels 16 and 18 are jack assemblies indicated generally at 90, see Figures 1 and 9. The jack assemblies 90 may include a conventional pneumatic cylinder 92 and an extendible rod 94 incorporating an abutment plate or head portion 96 engageable with an overlying portion of the auxiliary cargo vehicle 22 to subsequently be described in detail. The jack assembly 90 will be utilized for taking some of the load off of the wheels of the auxiliary cargo vehicle 22 i. e. for distributing the load of a weighted vehicle on the bed of the trucking vehicle. The cylinder 92 incorporates from one side thereof laterally extending pin elements 98 extending through a slotted leg 100 of a mounting hinge indicated generally at 102. The mounting hinge 102 incorporates an intermediate bend 104 normal to the leg 100 and terminating in a suitable hinge portion 106 secured on the exterior of the outer flange of the channel 16 or 18 by means of welding, for example. As clearly seen in Figure 9, shown by means of phantom lines, the jack assembly 90 may be pivoted out of its vertically extending relationship within the channel 16 to a position disposed laterally at the side of said channel. The resultant phantom line disposition of the jack assembly 90 facilitates the movement of the auxiliary cargo vehicle onto the bed of the trucking vehicle.

The auxiliary cargo vehicle 22 incorporates a chassis indicated generally at 108 comprising side frame members 110 and 112 having extending longitudinally therebetween a tubular rectangular frame member 114 all of which being secured to a substantially planar horizontal support bed 116. Suitably secured to the support bed 116 at the forward and rear ends thereof are end walls 118 and 120, respectively. The support bed 116 incorporates a plurality of longitudinally spaced suitably secured transversely extending bracing channels 122, see Figure 1. Extending vertically in suitably secured longitudinally spaced relationship from opposite edge portions of the support bed 116 of the auxiliary vehicle are support channels 124, and extending transversely in parallel relation to the bed 116 is a suitable cover or top member 126. The end walls 118 and 120 have suitably secured on the inner surface thereof vertically spaced transverse support channels 128, and the support member 124 have suitably secured in transverse vertically spaced relationship on opposite sides thereof similar support channels 128. The channels 128 incorporate transversely through the overlying flange portions 130 thereof and adjacent opposite ends aperture portions 132. Juxtaposed on the upper flange portions 130 are suitable transverse shelving panels 134 incorporating transverse apertures therethrough alignable with the previously mentioned apertures 132, the apertures of the shelving panels 134 and those through the flanges 130 of the support channels receiving therethrough removable retaining pins 136, see Figure 10, for example. The vertically spaced support channels 128 provide means for adjusting the height of the various tiers of shelves on the auxiliary cargo vehicle, and accordingly the shelves are open transversely of the cargo vehicle facilitating the loading and unloading of beverage cases, for example.

The auxiliary cargo vehicle incorporates adjacent the rear end wall 120 a suitable battery compartment 138 receiving therein a storage battery 140 for supplying the source of energy to electric motors for driving and steering the auxiliary cargo vehicle. The end wall 120 incorporates a suitable access portion accessible from the rear of the auxiliary cargo vehicle, and a suitable access door 142 is provided on the rear end wall 120.

Extending laterally from the rear surface of the end wall 120 in alignment with channels 24 and 26 of the ramp 20 are a pair of transversely spaced strap elements 142, see Figure 4, for example, extending through suitable apertures 144 in the web of the channels 24 and 26, and a suitable retaining pin 146 is removably received in a suitable aperture portion of the members 142, this expedient serving to retain the ramp in juxtaposition on the outer surface of the end wall 120 of the auxiliary cargo vehicle. When the ramp is disposed in this manner it aids in preventing longitudinal movement of the auxiliary cargo vehicle relative to the trucking vehicle cooperating with the crowd-bar assembly 58 previously described in detail.

Hingedly mounted on its lower edge in any suitable manner on the outer surface of the end wall 120 adjacent the lower edge thereof is a vertically pivotal support platform 148 upon which an operator of the auxiliary vehicle will stand, said platform 148 being retained in juxtaposition on the outer surface of the end wall 120 by means of the lower brace member 44 of the loading ramp 20, see Figure 3. The platform 148 may have suitably secured to its upper edge flexible support chains 150 disposing the platform 148 in a substantially horizontal position when the ramp 20 is lowered. If desired, the platform 148 may incorporate suitable spring hinges positively urging the platform toward folded relation on the outer surface of wall 120.

The vertical wall 120 incorporates thereon a suitable control panel 152 incorporating control levers operatively connected to the battery 138 and a pair of electric motors 154 and 156 mounted in the tubular frame member 114, the motor 154 serving as the means for propelling the auxiliary cargo vehicle, and the motor 156 providing the means for power steering the same. The control panel 152 will incorporate suitable control switches 158 and 160 for controlling the respective motors 154 and 156, the control lever 158 providing means for driving the auxiliary cargo vehicle forwardly or rearwardly, and the control lever 160 providing means for turning the auxiliary cargo vehicle to the right or left.

The auxiliary cargo vehicle 22 incorporates in mutually parallel suitably secured depending relationship from the channels 110 and 112 adjacent the forward end of the vehicle a pair of support yokes 162 conveniently comprising a pair of plate members 164 and 166, see Figure 6, for example, terminating at their lower ends in aligned journal portions 166 and 168, respectively, having extending transversely therethrough a suitably supported axle 170. Journaled on the axle 170 is a suitable wheel 172. The wheels 172 have on the inwardly disposed side thereof annular recess 174, see Figure 4. The wheels 172 incorporate on the inner periphery of the rim 176 formed by the annular recess 174 a spur gear 178, see Figures 4 and 5. The electric motor 154 has extending transversely from opposite sides thereof a drive shaft 180, being suitably journaled on the depending flange portions of the channel members 110 and 112, said drive shaft 180 incorporating on the end portions thereof a suitably keyed drive pinion gear 182, see Figure 5, for example, interengaged with a spur gear 178.

Accordingly, rotation of the drive shaft 180 by the electric motor 154 will provide means for propelling the auxiliary cargo vehicle by rotating the forward wheels 172 of said vehicle.

Suitably secured in depending relationship from the channels 110 and 112 adjacent the rear end portion of the auxiliary cargo vehicle are a pair of aligned horizontally rotatable wheel assemblies indicated generally at 184. The wheel assemblies 184, see Figures 7 and 8, incorporate an annular centrally recessed mounting plate 186 suitably secured on the under surface of the web of the channels 110 and 112. The recess portion 188 of the mounting plate 186 has extending therethrough a suitably conformed stub shaft portion 190 integral with an annular plate 192, said plate 192 having depending therefrom in suitably secured relationship a pair of mutually parallel support plates 194 and 196 terminating at their lower ends in axially aligned journal sleeve portions 198 and 200, respectively, receiving therethrough a suitable support shaft 202 which has journaled thereon a suitable support wheel 204. Suitable bearings 206 may be interposed between the under surface of the mounting plate 186 and the upper surface of the mounting plate 192, see Figure 7. The mounting plate 192 incorporates on the outer periphery thereof a semi-circular gear segment 208 incorporating helical gear teeth. The electric motor 156 has extending transversely from opposite sides thereof a drive shaft 210 having circumposed about opposite ends thereof a suitable worm gear 212 interengaged with the gear segment 208, the drive shaft 210 being suitably journaled in the depending flanges of the channels 110 and 112. Rotation of the drive shaft 210 will result in rotation about the longitudinal axis of the stub shaft 190 of the horizontally pivotal wheel assemblies 184 accordingly turning the auxiliary cargo vehicle. Suitably secured on the inner surfaces of the depending flanges of the channels 110 and 112 are suitable limit switches 214 operatively connected to the motor 156 in any suitable manner, the plate 192 having extending radially therefrom an abutment element 216 which is diametrically opposed to the central portion of the arcuate gear segment 208, said abutment element 216 being engageable with the limit switches 214 at the position when the wheel assemblies 184 have made a maximum turn to either the right or the left. Although the expedient of limit switches has been disclosed for the purpose of limiting the turns accomplished by the auxiliary cargo vehicle, other means for limiting the turning of the wheel assemblies 184 may be adapted.

The foregoing is considered as illustrative only of the principles of the invention. Further, since numerous modifications and changes will readily occur to those skilled in the art, all suitable modifications and equivalents may be resorted to, falling within the scope of the appended claims.

What is claimed as new is as follows:

1. In combination, a trucking vehicle including a horizontal bed, track means on said bed, a pivotal ramp on said bed in alignment with the track means for disposition at one end on a loading dock facilitating the loading of said bed, an auxiliary power operated cargo vehicle removably received on the track means, lock means restraining the auxiliary cargo vehicle on said track means, said auxiliary vehicle including a rear end wall, and means on the end wall of said auxiliary vehicle detachably engaging the pivotal ramp retaining the ramp in vertically juxtaposed relation on the outer surface of the end wall for aiding and restraining the auxiliary cargo vehicle against longitudinal movement on said tracks.

2. In combination, a trucking vehicle including a horizontal bed, track means on said bed, a pivotal ramp on said bed in alignment with the track means for disposition at one end on a loading dock facilitating the loading of said bed, an auxiliary power operated cargo vehicle removably received on the track means, and lock means restraining the auxiliary cargo vehicle on said track means, said track means comprising a pair of spaced longitudinally extending tracks on the upper surface of the bed, vertical abutments transversely of the forward end of the tracks engageable with wheels on the auxiliary vehicle, said lock means including crowd-bar assemblies removably supported vertically of the tracks beneath the under surface of the auxiliary vehicle in longitudinally spaced relationship from the vertical abutments, said crowd-bar assemblies including adjustable clamping means for applying pressure on the wheels of the auxiliary vehicle for restraining said auxiliary vehicle against longitudinal movement on said bed.

3. In combination, a trucking vehicle including a horizontal bed, track means on said bed, a pivotal ramp on said bed in alignment with the track means for disposition at one end on a loading dock facilitating the loading of said bed, an auxiliary power operated cargo vehicle removably received on the track means, and lock means restraining the auxiliary cargo vehicle on said track means, said track means comprising a pair of spaced longitudinally extending tracks on the upper surface of the bed, vertical abutments transversely of the forward end of the tracks engageable with wheels on the auxiliary vehicle, said lock means including crowd-bar assemblies removably supported vertically of the tracks beneath the under surface of the auxiliary vehicle in longitudinally spaced relationship from the vertical abutments, said crowd-bar assemblies including adjustable clamping means for applying pressure on the wheels of the auxiliary vehicle for restraining said auxiliary vehicle against longitudinal movement on said bed, said tracks comprising upwardly directed channel members, said ramp comprising a pair of channel members pivotally supported in spaced relation on a rear end portion of said horizontal bed in alignment with said tracks, said auxiliary vehicle including a rear end wall, and means on the end wall detachably engaging the pivotal ramp retaining the ramp in vertically juxtaposed relation on the outer surface of the end wall for aiding in restraining the auxiliary cargo vehicle against longitudinal movement on said tracks.

4. In combination, a trucking vehicle including a horizontal bed, track means on said bed, a pivotal ramp on said bed in alignment with the track means for disposition at one end on a loading dock facilitating the loading of said bed, an auxiliary power operated cargo vehicle removably received on the track means, and lock means restraining the auxiliary cargo vehicle on said track means, said track means comprising a pair of spaced longitudinally extending tracks on the upper surface of the bed, vertical abutments transversely of the forward end of the tracks engageable with wheels on the auxiliary vehicle, said lock means including crowd-bar assemblies removably supported vertically of the tracks beneath the under surface of the auxiliary vehicle in longitudinally spaced relationship from the vertical abutments, said crowd-bar assemblies including adjustable clamping means for applying pressure on the wheels of the auxiliary vehicle for restraining said auxiliary vehicle against longitudinal movement on said bed, said abutments comprising rearwardly opening recess portions at the forward end of said tracks for receiving the forward wheels of the auxiliary vehicle therein, said recess portions including an upper wall overlying said tracks, overlying apertures extending through the upper wall and the tracks, said crowd-bar assemblies including an elongated body member having a lateral flange portion at the upper end thereof removably received in the aperture in the upper wall, a spring biased pivotal latch element on the lower end of the body member removably received in the aperture in the tracks, the adjustable clamping means extending transversely through an intermediate portion of the body member and including an abutment portion extendible toward and away from the outer periphery of the forward wheels of the auxiliary vehicle.

5. In combination, a trucking vehicle including a horizontal bed, track means on said bed, a pivotal ramp on said bed in alignment with the track means for disposition at one end on a loading dock facilitating the loading of said bed, an auxiliary power operated cargo vehicle removably received on the track means, lock means restraining the auxiliary cargo vehicle on said track means, and load distributing jack means pivotally mounted laterally of the tracks and including hinge means permitting the jack means to be disposed on the upper surface of said tracks, said pack means including an extendible and retractable rod portion engageable with the under surface of the auxiliary vehicle.

6. In combination, a trucking vehicle including a horizontal bed, track means on said bed, a pivotal ramp on said bed in alignment with the track means for disposition at one end on a loading dock facilitating the loading of said bed, an auxiliary power operated cargo vehicle removably received on the track means, and lock means restraining the auxiliary cargo vehicle on said track means, said track means comprising a pair of spaced longitudinally extending tracks on the upper surface of the bed, vertical abutments transversely of the forward end of the tracks engageable with wheels on the auxiliary vehicle, said lock means including crowd-bar assemblies removably supported vertically of the tracks beneath the under surface of the auxiliary vehicle in longitudinally spaced relationship from the vertical abutments, said crowd-bar assemblies including adjustable clamping means for applying pressure on the wheels of the auxiliary vehicle for restraining said auxiliary vehicle against longitudinal movement on said bed, said tracks comprising upwardly directed channel members, said ramp comprising a pair of channel members pivotally supported in spaced relation on a rear end portion of said horizontal bed in alignment with said tracks, said auxiliary vehicle including a rear end wall, and means on the end wall detachably engaging the pivotal ramp retaining the ramp in vertically juxtaposed relation on the outer surface of the end wall for aiding in restraining the auxiliary cargo vehicle against longitudinal movement on said tracks, said end wall including a vertically pivotal transversely disposed operator support platform on the rear surface thereof, means on the pivotal ramp engageable with said platform for restraining the platform in juxtaposition on the outer surface of the end wall, and operator control means on the end wall of the auxiliary cargo vehicle for maneuvering the same.

7. In an auxiliary cargo vehicle, a chassis including depending longitudinal side frames, a pair of oppositely disposed wheel assemblies journaled on the frames for horizontal rotation thereon, gear segments on the wheel assemblies concentric to the axis of rotation thereof, helical gear teeth on the outer periphery of the gear segments, a motor beneath the chassis, a drive shaft extending from opposite sides of the motor normal to the longitudinal axis of the chassis, worm gears on opposite ends of said drive shaft interengaged with the helical gear teeth for simultaneously rotating the wheel assemblies, and means limiting the extent of rotation of said wheel assemblies about their longitudinal axes for steering the vehicle, a pair of oppositely disposed wheel assemblies depending from the side frame members, said wheel assemblies including wheels mounted in axial alignment normal to the longitudinal axis of the chassis, said wheels including inwardly opening annular recesses, an integral spur gear on the inner periphery of the recesses, a motor beneath the chassis disposed between said wheels, a drive shaft extending from opposite sides of the motor normal to the longitudinal axis of the chassis, pinion gears on the ends of said drive shaft interengaged with the spur gears in the annular recesses of the wheels, the last mentioned wheel assemblies being disposed at the forward end of the chassis, and the first mentioned wheel assemblies being disposed at the rear end of the chassis, a self contained source of electrical energy on said chassis, and control means operatively connected to the source of electrical energy and the motors.

References Cited in the file of this patent

UNITED STATES PATENTS

| | | |
|---|---|---|
| 671,856 | Darley | Apr. 9, 1901 |
| 1,280,141 | Bonner | Oct. 1, 1918 |
| 1,584,517 | Dinkelberg | May 11, 1926 |
| 1,942,022 | Faries | Jan. 2, 1934 |
| 2,033,119 | Bennett | Mar. 10, 1936 |
| 2,298,448 | Arentzen | Oct. 13, 1942 |
| 2,351,314 | Ario | June 13, 1944 |
| 2,664,307 | Wieland | Dec. 29, 1953 |
| 2,736,602 | Ault | Feb. 28, 1956 |